(12) United States Patent
Shor et al.

(10) Patent No.: US 6,191,867 B1
(45) Date of Patent: Feb. 20, 2001

(54) METHOD AND DEVICE FOR CALIBRATING AN IMAGING APPARATUS

(75) Inventors: Steven M. Shor, Woodbury; Eric J. Donaldson; James L. Hartmann, both of St. Paul; Steven W. Tanamachi, Lauderdale, all of MN (US)

(73) Assignee: Eastman Kodak Company, Rochester, NY (US)

( * ) Notice: Under 35 U.S.C. 154(b), the term of this patent shall be extended for 0 days.

(21) Appl. No.: 08/972,102

(22) Filed: Nov. 17, 1997

(51) Int. Cl.$^7$ ........................................................ H04N 1/40
(52) U.S. Cl. ............................ 358/1.9; 358/298; 358/406; 358/456; 399/177
(58) Field of Search ............................ 358/406, 475, 358/456, 504, 298, 1.9; 399/177, 181; 395/109

(56) References Cited

U.S. PATENT DOCUMENTS

| | | | |
|---|---|---|---|
| 4,583,128 | 4/1986 | Anderson, Jr. | 358/302 |
| 4,999,673 | 3/1991 | Bares | 355/208 |
| 5,170,257 | 12/1992 | Burns | 358/298 |
| 5,258,810 | 11/1993 | Bresina | 355/208 |
| 5,260,806 | 11/1993 | Samworth | 358/456 |
| 5,262,825 | 11/1993 | Nordeen | 355/208 |
| 5,309,246 | 5/1994 | Barry | 358/298 |
| 5,345,315 | 9/1994 | Shalit | 358/406 |
| 5,416,613 * | 5/1995 | Rolleston et al. | 358/504 |
| 5,457,541 | 10/1995 | Burns | 358/298 |
| 5,473,734 | 12/1995 | Maskell et al. | 395/109 |
| 5,481,657 | 1/1996 | Schubert | 395/118 |
| 5,649,073 | 7/1997 | Knox et al. | 395/109 |
| 5,818,977 * | 10/1998 | Tansley | 382/294 |
| 5,883,985 * | 3/1999 | Pourjavid | 382/274 |

FOREIGN PATENT DOCUMENTS

| | | | |
|---|---|---|---|
| 0 426 435 A2 | 5/1991 | (EP) | H04N/1/40 |
| 0 440 209 * | 8/1991 | (EP) . | |
| 0 440 209 A2 | 8/1991 | (EP) | G03B/27/66 |
| 0 539 901 A2 | 4/1993 | (EP) | H04N/1/46 |
| 0 625 847 A1 | 11/1994 | (EP) | H04N/1/46 |
| 0 679 946 | 2/1995 | (EP) . | |
| 0 426 435 * | 1/1997 | (EP) . | |
| 59-216165 * | 12/1984 | (JP) . | |

\* cited by examiner

Primary Examiner—Thomas D. Lee
(74) Attorney, Agent, or Firm—William F. Noval

(57) ABSTRACT

A method and apparatus for calibrating a halftone imaging system is described which automatically compensates for drifts in overall system performance as well as for any substantial change in the imaging parameters. Calibration is achieved by optimizing the exposure level of the imaging system and linearizing the exposure level of the imaging system based on the determined optimized exposure level. The method and apparatus of the present invention are capable of calibrating an imaging system automatically by generating lookup tables and transfer functions without substantial operator intervention. Once calibration is achieved, subsequent imaging commands are automatically mapped to appropriate commands that produce a calibrated output image.

27 Claims, 4 Drawing Sheets

METHOD AND DEVICE FOR CALIBRATING AN IMAGING APPARATUS

FIELD OF THE INVENTION

This invention relates generally to the field of imaging, and more particularly to a method and device for calibrating an imaging apparatus.

BACKGROUND OF THE INVENTION

Many existing printing devices are bi-level devices that cannot readily reproduce continuous tone images. Thus, a continuous tone image is approximated by first defining a halftone grid, known as a screen. The screen is essentially an array of regions known as halftone cells. Each halftone cell typically has a fixed size, and is defined by a matrix of addressable pixels that can be selectively turned "on" in a digital, "bi-level" manner to form various patterns. The human eye integrates the array of halftone cells to form a visual perception of a continuous tone image. A gray value is assigned to each halftone cell within the screen in order to represent the gray value of the corresponding areas of the continuous tone image. By activating a percentage of the pixels contained within each halftone cell, the cell simulates a shade of gray which closely approximates the respective area of the continuous tone image. For example, in order to approximate a lighter area of the image, a smaller percentage of pixels, such as 10%, of the halftone cell will be activated. To simulate a darker image region, a higher percentage of the pixels will be activated. These techniques are well known in the art.

A conventional printing device produces halftone images by forming halftone dots on a medium at locations corresponding to each pixel that has been turned "on" in the respective halftone cell. The process of forming the halftone dot is particular to the type of printing device. For example, the spots may be formed by depositing ink or toner on a printing substrate at locations corresponding to the activated points. Alternatively, spots may be formed on a photographic film or a thermographic film by exposure to a radiation or thermal energy, respectively. Other printing devices employ processes such as dye sublimation or thermal mass transfer as are known in the art.

Many printing devices reproduce an original color image by separating the image into color components such as yellow, cyan, magenta and black. The color components are independently formed on a respective medium according to the halftone process described above. For example, in offset printing a printing plate is created for each color component and the color image is reproduced by overprinting colored inks.

Dot gain is a well known problem associated with halftone systems and refers to an apparent change in size of a printed halftone dot from its target size. This phenomenon is caused by many factors such as a tendency of ink to spread or variations in film characteristics. For example, when 50% of the dots within a halftone cell are exposed, the resulting dark area may cover more than or less than 50% of the total area defined by the halftone cell. Typically, this is due to nonlinear effects in the imaging system, film, media or processing system. Because 0% and 100% are usually achievable, a non-linear relationship may exist between the target dot area and the resultant dot area.

A subset of conventional printing devices, referred to as imagesetters, consist of a front-end raster image processor (RIP) and a recording device for producing the image on film or paper. Manual calibration techniques are well known in the industry as a means for calibrating a halftone imagesetter so as to compensate for dot gain. Typically an operator of a printing device uses a densitometer to detect dot gain. A densitometer is an instrument that measures the perceived optical density of the reproduced image. A densitometer typically consists of a light emitting component for illuminating the reproduced image and a photodetector for measuring light reflected from the image. Alternatively, the photodetector measures light transmitted through the reproduced image. The darker the image the more light it absorbs and the higher the density reading from the densitometer. During the calibration process a grayscale test pattern is printed which includes a series of halftone image regions. Each image region has a different predetermined dot area. For example a series of image region is usually printed such that the dot areas range from 2% to 100%. The operator manually measures the density of each image region with a standard densitometer. From these measurements, a "transfer function" is created to map any subsequently requested dot area to a dot area which produces the correct visual density.

Conventional calibration methods operate at either the application level or at the RIP level. Application level methods send a transfer function with each print job. On the other hand, RIP-based compensation techniques require the RIP to store transfer functions. The operator selects the correct transfer function based on current operating conditions. If the operating conditions change, such as the use of a new media type, the operator generates a grayscale test pattern, manually measures the densities with a densitometer, generates a transfer function and designates the new function for current use. If no major system change occurs, the functions may be used for an extended period such as several weeks.

Another RIP-based calibration technique sequentially changes software input variables such as resolution, frequency and medium (film/paper). A new test pattern is printed for each combination. The operator manually measures each test pattern with a densitometer and creates a plurality of transfer functions. The RIP selects the correct transfer function based on the current print job.

The above-described calibration approaches require the operator to determine when calibration is appropriate and therefore require substantial operator interaction. As such, they fail to adjust for drifts in overall system transfer function. Additionally, they fail to adequately account for the sensitometric response of the film to different levels of exposure and for factors introduced by lot-to-lot variations of similar film types.

For the reasons stated above, and for other reasons stated below which will become apparent to those skilled in the art upon reading and understanding the present specification, there is a need in the art for a method and device for calibrating a halftone printing system without requiring operator intervention, thereby adapting to drifts in overall system performance including variations in media characteristics and media development parameters. Furthermore, there is a need in the art for a calibration device that minimizes imaging errors due to dot gain.

SUMMARY OF THE INVENTION

To overcome the problems in the prior art, the present invention provides an improved method and device for calibrating an imaging apparatus. In one embodiment, the invention is a method for calibrating a halftone imaging system having a radiation source for exposing an imaging element. The method includes the step of forming a plurality of image regions on an imaging element with the radiation source such that each image region is defined by at least one corresponding halftone cell. The halftone cells of different image regions have an equal target dot area and are exposed by the radiation source at different exposure levels. Next, an optimum exposure level is set for the imaging system based on a comparison of the halftone cells of each image region. For example, the optimum exposure level may be set for the imaging system based on a comparison between the target dot area and an actual dot area for the halftone cells of each image region. In one embodiment, the optimum exposure level is set such that the halftone imaging system produces a 50% halftone cell having a dot area substantially equal to half of the 50% halftone cell. In another embodiment, the optimum exposure level is set such that the halftone imaging system produces a 2% halftone cell having a dot area approximately equal to a non-imaged area of a 98% halftone cell. In yet another embodiment, the optimum exposure level is set such that the halftone imaging system produces a 50% halftone cell having a dot area greater than half of the 50% halftone cell.

According to one feature of the invention, the optimum exposure level is set by measuring a corresponding density for each image region, measuring a minimum density for a non-imaged area of the element, calculating the actual dot area for each image region based on the measured density for each region and the measured minimum density, and generating a dot-area versus exposure curve based on the actual dot areas for each of the image regions. The minimum density of the non-imaged area of the element may be automatically measured by a densitometer coupled to a processor. Alternatively, the minimum density of the non-imaged area of the element may be manually measured.

According to another feature of the invention, a reduced number of image regions are formed on the imaging element based on a predetermined parameterization of a sensitometric curve for the imaging element.

In another embodiment, the present invention is a method for calibrating a halftone imaging system including the step of forming a first plurality of image regions on an imaging element with the radiation source. Each image region of the first plurality of image regions is defined by at least one corresponding halftone cell having a plurality of dots. The dots of the halftone cells of different image regions have an equal target dot area and are exposed by the radiation source at different exposure levels. An optimum exposure level is set for the imaging system based on a comparison between the target dot area and an actual dot area for each respective image region of the first plurality of image regions. Additionally, a second plurality of image regions is formed on the element such that each image region of the second plurality of image regions is defined by at least one corresponding halftone cell having a plurality of dots. The halftone cells of different image regions of the second plurality of image regions, however, have different target dot areas and are exposed by the radiation source at the determined optimal exposure level. A linearization mechanism is developed for mapping subsequent target dot areas to respective actual dot areas based on a comparison between the target dot area and an actual dot area for each respective image region of the second plurality of image regions. The linearization mechanism may be a lookup table for mapping target dot areas to specific actual dot areas. Additionally, the linearization mechanism may a plurality of lookup tables according to variations in system parameters including at least resolution and imaging speed. According to one aspect of the invention, the halftone imaging system includes a raster image processor and a recorder. Furthermore, the linearization mechanism is developed by calculating a coarse lookup table and a fine-grain lookup table according to variations in system parameters including at least resolution and imaging speed. The coarse lookup table is applied by the raster image processor and the fine-grain lookup table is applied by the recorder.

In another aspect, the present invention is a method for automatically calibrating a halftone image recorder. The method includes the step of forming a plurality of image regions on the element such that each image region is defined by at least one corresponding halftone cell having a plurality of dots. The halftone cells of different image regions have different target dot areas and are exposed by a radiation source at substantially equal exposure levels. A densitometer is controlled to measure a corresponding density for each image region. Furthermore, the densitometer is controlled to measure a minimum density for a non-imaged area of the element. Next, a controller calculates an actual dot area for each image region and an error between the target dot area and the respective actual dot area for each image region. The controller is commanded to: (1) develop a linearization mechanism based on the respective errors for each image region, the linearization mechanism mapping target dot areas to respective actual dot areas, and (2) automatically map subsequent target dot areas received from the raster image processor to respective actual dot areas based on the linearization mechanism.

In yet another embodiment, the invention is an apparatus for calibrating a halftone imaging system. The apparatus includes a radiation source for exposing an imaging element. A densitometer measures a density of the imaging element. A controller is coupled to the radiation source and the densitometer for performing the steps of: (i) controlling the radiation source to form a first plurality of image regions on an imaging element such that each image region of the first plurality of image regions is defined by at least one corresponding halftone cell having a plurality of dots, wherein the dots of the halftone cells of different image regions have an equal target dot area and are exposed by the radiation source at different exposure levels; (ii) controlling the densitometer to measure a corresponding density for each image region of the first plurality of image regions; (iii) controlling the densitometer to measure a minimum density for a non-imaged area of the element; (iv) calculating an actual dot area for each image region of the first plurality of image regions as a function of the corresponding density and the minimum density; (v) setting an optimum exposure level for the imaging system based on a comparison between the target dot area and the actual dot area for each image region of the first plurality of image regions; (vi) controlling the radiation source to form a second plurality of image regions on the element such that each image region of the second plurality of image regions is defined by at least one corresponding halftone cell having a plurality of dots, wherein the halftone cells of different image regions of the second plurality of image regions have different target dot areas and are exposed by the radiation source at the determined optimal exposure level; (vii) measuring a corresponding density for each image region of the second plurality of image regions; (viii) calculating an actual dot area for each of the image regions of the second plurality of image regions; (ix) calculating an error between the target dot area for each of the image regions of the second plurality of image regions and the respective actual dot area; and (x) developing a linearization mechanism for mapping subsequent target dot areas to respective actual dot areas based on the calculated error.

These and other features and advantages of the invention will become apparent from the following description of the preferred embodiments of the invention.

DETAILED DESCRIPTION OF THE INVENTION

In the following detailed description, references are made to the accompanying drawings which illustrate specific embodiments in which the invention may be practiced. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Figure 1:
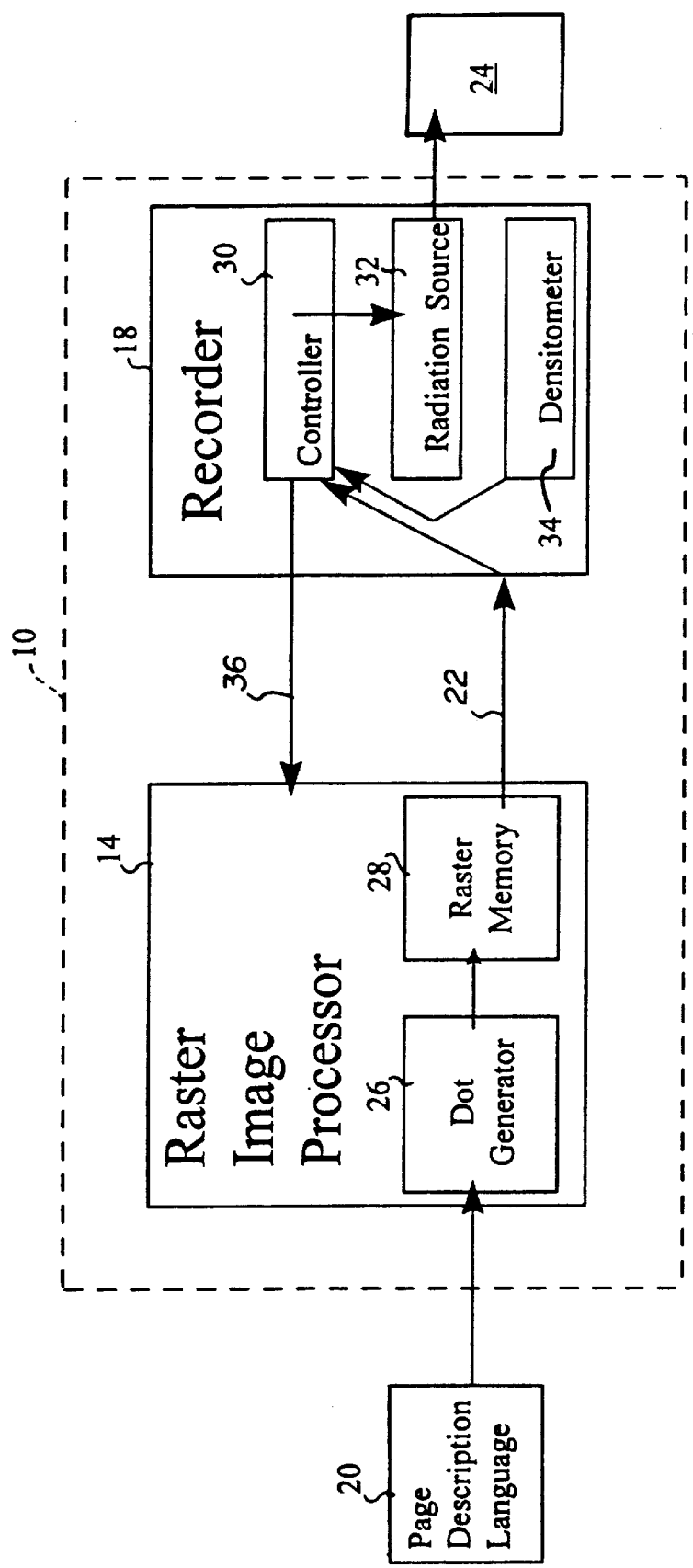
FIG. 1 is a block diagram of imagesetter having a calibration device in accordance with the present invention.

Referring to the drawings, FIG. 1 illustrates an imagesetter 10 in block diagram form. Imagesetter 10 includes raster image processor (RIP) 14 and recorder 18. RIP 14 receives PDL file 20 which contains image data characterized in a page description language (PDL) such as Postscript™. As one example, RIP 14 receives PDL file 20 directly from a workstation (not shown) in the form of a data file. In another example, RIP 14 is connected to a network and receives PDL file 20 from one of a plurality of workstations (also not shown). Additionally, RIP 14 may include a local media reader for loading PDL file 20 from a removable media.

Upon receiving PDL file 20, RIP 14 converts the image data contained within PDL file 20 into raster data 22 which is communicated to recorder 18. Recorder 18 forms a halftone image on imaging element 24. As one example, imaging element 24 may be photographic such that recorder 18 includes a processor station (not shown) for chemical processing and developing the halftone image formed on imaging element 24. In another example, imaging element 24 may be photothermographic which can be thermally processed and need not be chemically processed. Other imaging processes are also suitable for the present invention including direct thermal imaging, ablation imaging, dye transfer, ink jet, dye sublimation and thermal mass transfer.

RIP 14 may includes dot generator 26 and a raster memory 28. Dot generator 26 receives PDL file 20 and generates a series of halftone dots. The halftone dots are proportional in size to gray values of an image represented by PDL file 20 and are stored in raster memory 28 as raster data. Controller 30 commands recorder 18 such that radiation source 32 is modulated with raster data 22 to produce a latent halftone image on imaging element 24. Controller 30 represents a logic circuit suitable for device control. For example, controller 30 may be an embedded microprocessor having RAM, for data manipulation and general program execution, and ROM or flash memory for program storage.

Furthermore, radiation source 32 may comprise a laser diode scan module for emitting a suitable beam of radiation.

Recorder 18 engages a calibration process either when manually initiated by an operator or when a drift in system performance is automatically detected. Generally speaking, the calibration process consists of two phases: (1) exposure optimization phase and (2) exposure linearization phase.

Figure 2:
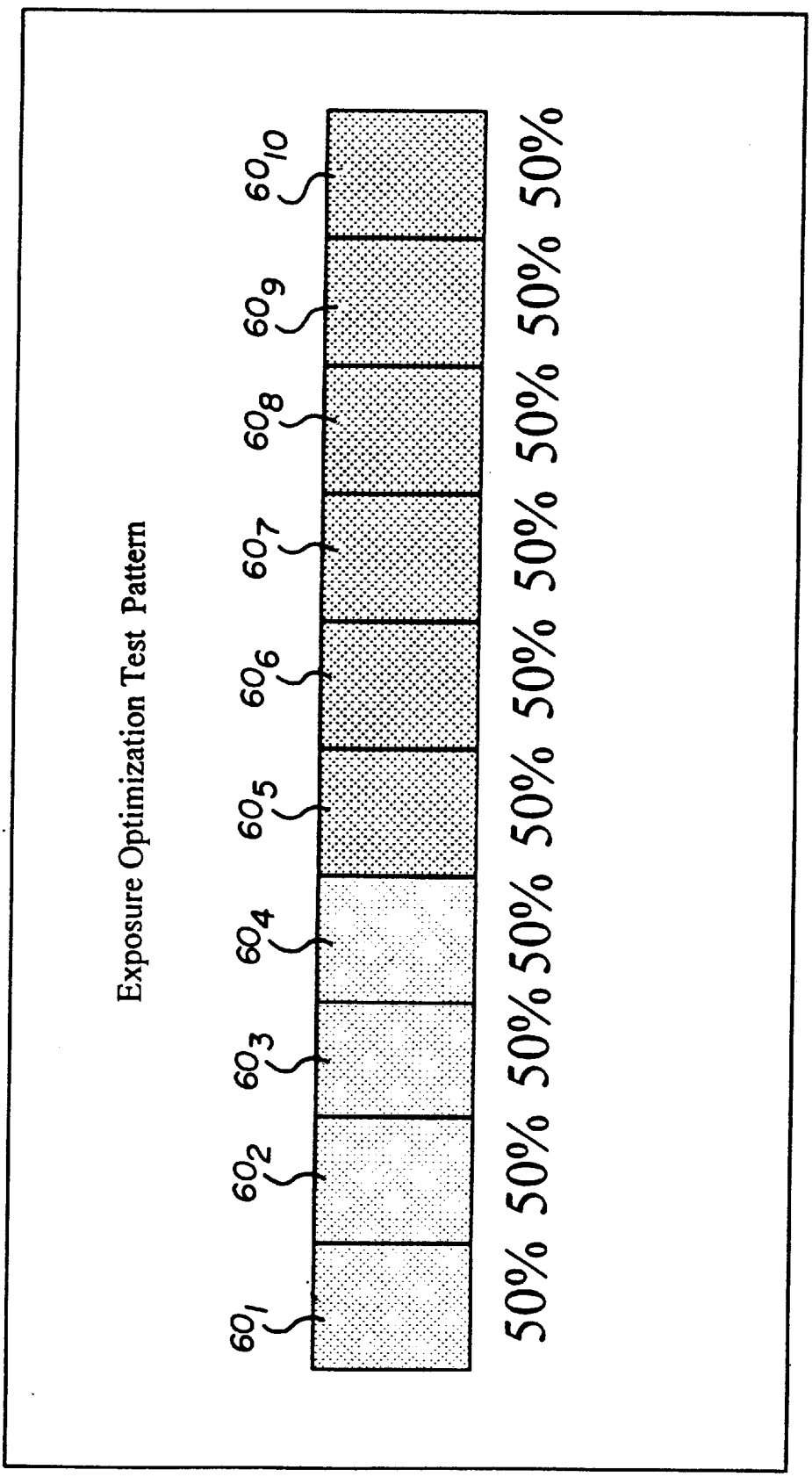
FIG. 2 is an example of a test pattern suitable for use by the present invention in setting an optimal exposure setting.

During the exposure optimization phase, recorder 18 forms an exposure optimization test pattern on imaging element 24. FIG. 2 illustrates one test pattern which may be used during the exposure optimization phase. Referring to FIG. 2, recorder 18 forms image regions $60_1$ through $60_{10}$ at a fixed halftone dot area. For example, in one embodiment image regions 60 are formed at 50% dot area. Controller 30 of recorder 18, however, commands radiation source 32 such that image regions 60 are formed at different exposure levels.

In one embodiment, controller 30 maintains a predetermined parameterization of a sensitometric curve for imaging element 24. More specifically, sensitivity of imaging element 24 may be characterized by a polynomial representing image density as a function of exposure level. By maintaining the sensitometric curve for imaging element 24, controller 30 selects the different exposure levels in order to form a reduced number of image regions 60.

After recorder 18 forms the exposure optimization test pattern illustrated in FIG. 2, densitometer 34 measures the densities of each image area 60 as imaging element 24 exits recorder 18. A light emitting component (not shown) of densitometer 34 sequentially illuminates each image area 60 as imaging element 24 passes within proximity as driven through recorder 18. Alternatively, densitometer 34 may be translated to proximity of imaging element 24. Densitometer 34 also includes a photodetector (also not shown) for measuring the light reflected from each image area 60. As another example, densitometer 34 may measure the light transmitted through each image area 60. Thus, recorder 18 should be suitably sealed to prevent external light from causing spurious measurement errors. It is also contemplated that a user may manually measure the densities of each image area 60 with a portable densitometer coupled to controller 30 via an external input/output port.

Densitometer 34 converts the density readings to digital representation and communicates them to controller 30. Controller 30 further commands densitometer 34 to read a minimum density of imaging element 24 from a non-imaged portion of imaging element 24. Based on the minimum density reading and the density readings from each image area 60, controller 30 calculates an actual dot area for each image area 60. For example, the following equation may be used to calculate the actual dot area:

$$\% \text{ Actual Dot Area} = 100 * (10^{-DMIN} - 10^{-D}) / (10^{-DMIN} - 10^{-DMAX})$$

where DMIN equals the minimum density reading, DMAX equals a maximum density reading and D equals the density reading for the corresponding image area 60 for which an actual dot area is being calculated. Because DMAX for imaging element 24 is generally large, such as greater than 4.0, the equation essentially reduces to:

$$\% \text{ Actual Dot Area} = 100 * \left(1 - \frac{10^{-D}}{10^{-DMIN}}\right)$$

In this manner, controller 30 need not measure a maximum density for the imaging element 24.

Based on these calculations, controller 30 generates a dot-area versus exposure curve for recorder 18. In one embodiment, interpolation of the dot-area versus exposure curve is linear; however, other embodiments are contemplated such as quadratic or cubic interpolation. Based on the dot-area versus exposure curve, along with a variety of operator selected criteria, controller 30 sets the optimum exposure for recorder 18. For example, in one embodiment controller 30 analyzes the dot-area versus exposure curve and sets the optimum exposure such that a 50% halftone cell has an actual dot area substantially equal to half of the 50% halftone cell. In another embodiment, controller 30 sets the optimum exposure such that record 18 produces a symmetric tonal scale wherein a 2% halftone cell has a dot area approximately equal to a non-imaged area of a 98% halftone cell. In yet another embodiment, controller 30 sets the optimum exposure such that a 50% halftone cell produced by recorder 18 comprises dots having an actual dot area that is slightly greater than half of the 50% halftone cell. This embodiment may be especially advantageous for producing finely detailed text.

One advantage of the above discussed calibration technique is that recorder 18 is capable of automatically setting of the optimal exposure level without requiring operator intervention such as manually measuring of the densities. It is also contemplated that the exposure optimization phase can be repeated while changing parameters such as resolution and scan speed of radiation source 32. In this manner, recorder 18 maintains optimum exposures levels for a wide variety of system parameters.

Figure 3:
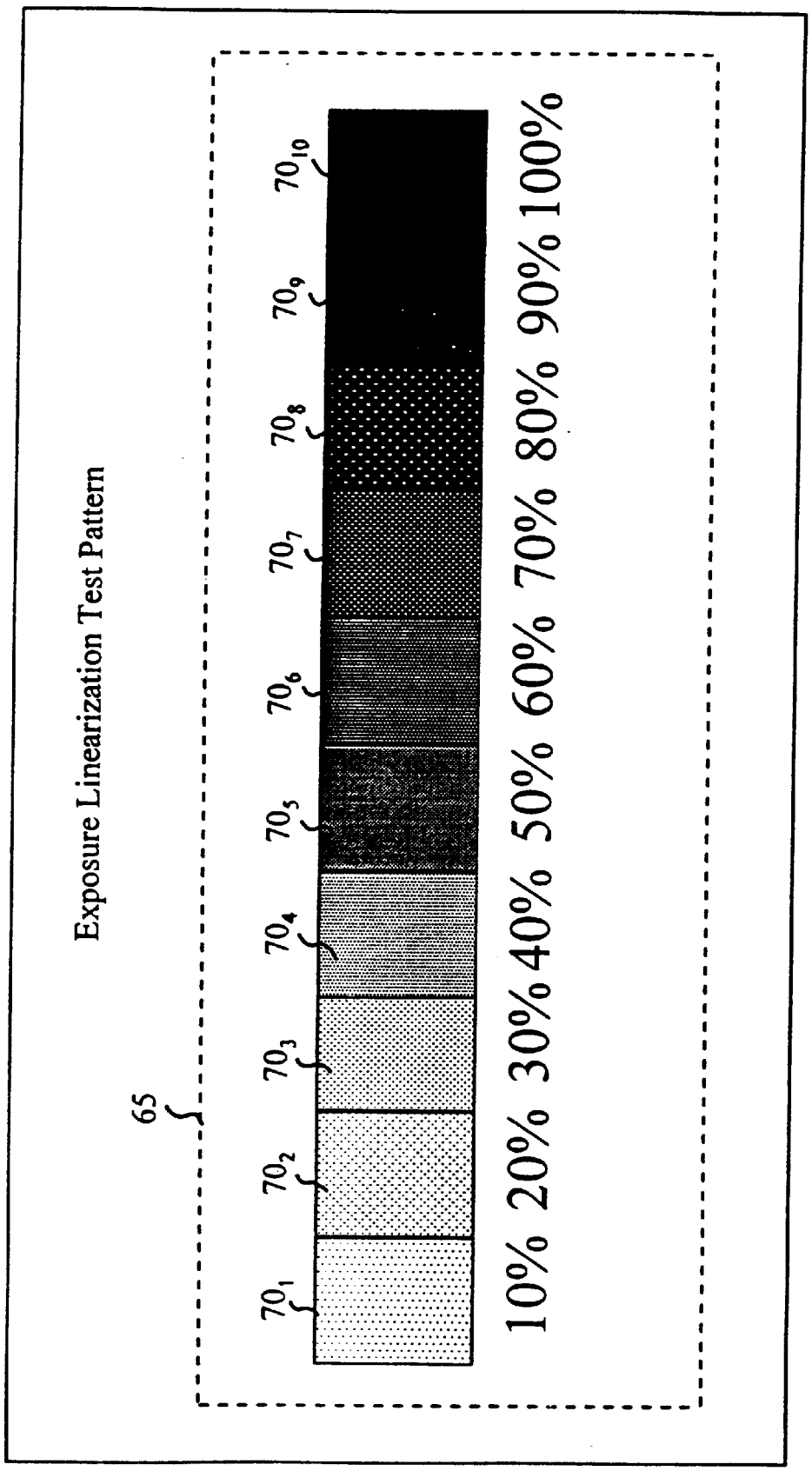
FIG. 3 is an example of a test pattern suitable for use by the present invention in performing exposure linearization.

During the exposure linearization phase, recorder 18 forms an exposure linearization test pattern on imaging element 24. FIG. 3 illustrates an exemplary test pattern used during the exposure linearization phase. Recorder 18 forms grayscale 65 which includes image regions $70_1$ through $70_{10}$. Each image area 70 of grayscale 65 has a different target dot area. For example, the corresponding dot areas may range from 10% to 100%, alternatively, the dot areas may range from 5% to 95%. Radiation source 32 forms each image area 70 by exposing imaging element 24 to radiation. The exposure level of radiation source 32 is fixed at the optimal exposure level that was set during the first phase of the calibration process.

After recorder 18 forms the exposure linearization test pattern illustrated in FIG. 3, densitometer 34 measures the densities of each image area 70 as imaging element 24 exits recorder 18. Densitometer 34 converts the density readings to digital representation and communicates them to controller 30. Densitometer 34 also reads the minimum density of imaging element 24 from any non-imaged portion. Based on the minimum density reading and the density readings from each image area 70, controller 30 calculates an actual dot area for each image area 70 and a corresponding error from the target dot area for each image area 70. Controller 30 uses the calculated error to generate a linearization mechanism for mapping target dot areas to actual dot areas. In one embodiment, controller 30 generates a lookup table as a linearization mechanism for linearization of recorder 18. In this manner, recorder 18 maintains a lookup table that minimizes the error between a target dot area and a corresponding actual dot area. In another embodiment, controller 30 uses the calculated error to generate a linearization function as a linearization mechanism that represents a relationship between target dot area and actual dot area.

Referring to FIG. 1, once calibration is achieved, recorder 18 maps raster data 22 to appropriate drive values for radiation source 32 based on the linearization mechanism generated during the calibration process. Thus, in this exemplary embodiment, RIP 14 is not involved in this calibration process and need not store linearization mechanisms. In another embodiment, linearization occurs at the RIP level wherein recorder 18 communicates the linearization mechanism to RIP 14 via communication line 36. RIP 14 receives linearization mechanism from communication line 36 and applies the mechanism to the image data of PDL file 20. Alternatively, RIP stores a plurality of linearization mechanisms generated by recorder 18 which may be selected by an operator. The present invention also contemplates a cooperative calibration scheme in which RIP 14 maintains a coarse linearization mechanism and recorder 18 maintains finer linearization mechanisms for generating the drive values for radiation source 32. Furthermore, in another embodiment, RIP 14 may directly control densitometer 34 and automatically generate linearization mechanisms.

Figure 4:
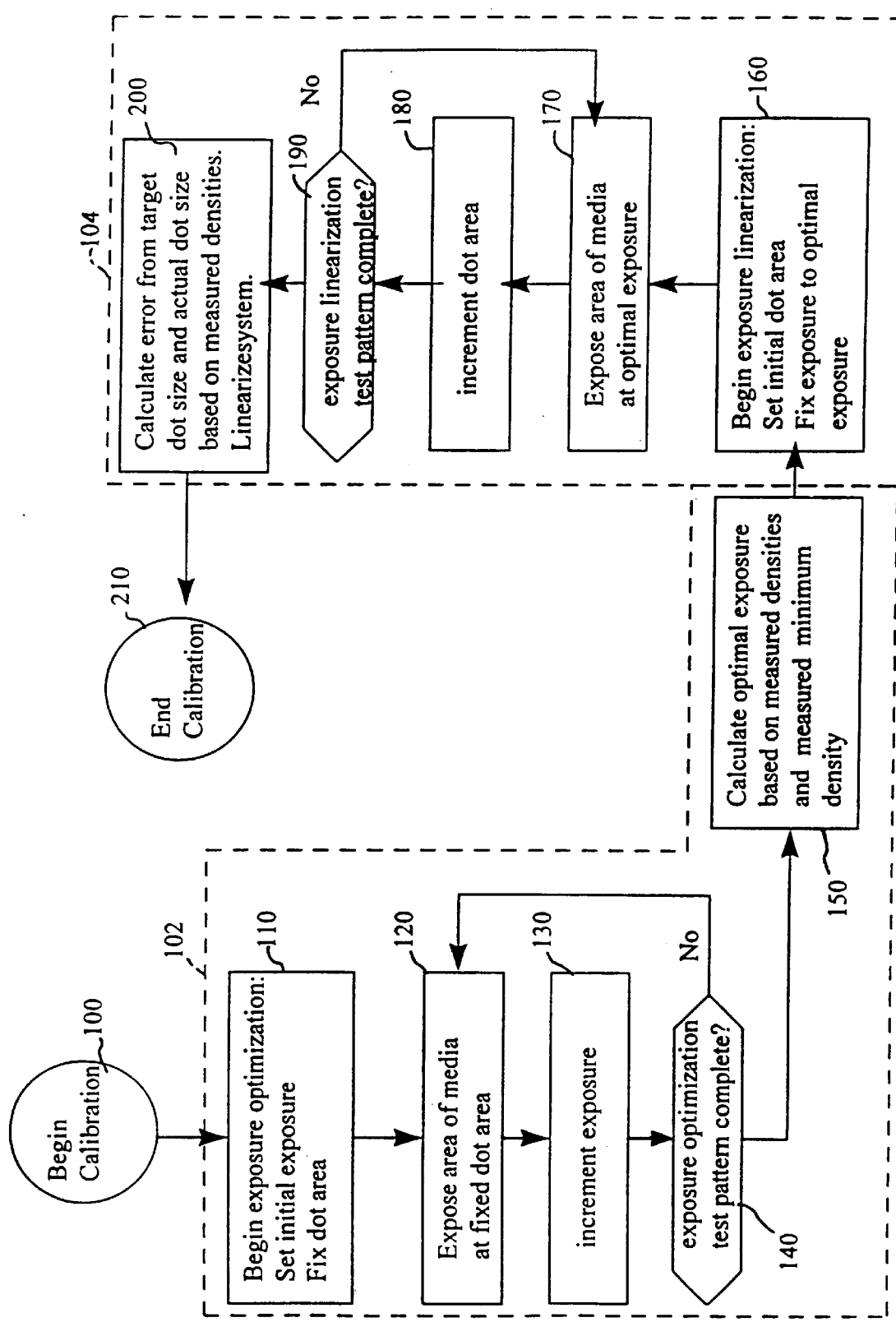
FIG. 4 is flow chart illustrating one embodiment of a mode of operation for a calibration method and device in accordance with the present invention.

FIG. 4 is a flow chart which illustrates one example of a mode of operation for recorder 18 during the automatic calibration process. Controller 30 executes a software program implementing the logical steps illustrated in the flow chart of FIG. 4. Phase 102 includes the logical steps of the exposure optimization phase while phase 104 includes the logical steps of the exposure linearization phase. Controller 30 begins the calibration process at starting step 100 and immediately proceeds to step 110 which sets the exposure level of radiation source 32 to a low initial level. Step 110 also fixes the target dot area, such as 50% as illustrated in the exposure optimization test pattern of FIG. 2. After the initial settings, controller 30 proceeds to step 120 and causes recorder 18 to form a first image area 60, (FIG. 2) of the exposure optimization test pattern. Controller proceeds to step 130 and increments the exposure setting of radiation source 32. Controller repeats steps 120 and 130 until each image area $60_1$ through $60_{10}$ is formed and decision step 140 is satisfied.

Once decision step 140 is satisfied, controller 30 proceeds to step 150 and calculates the optimal exposure based on density readings from densitometer 34 as described in detail above. Controller 30 then enters the exposure linearization phase 104 by proceeding to step 160.

In step 160, controller 30 sets the exposure intensity of radiation source 32 to the optimal exposure level as determined in step 150. Controller 30 repeats steps 170, 180 and 190 until radiation source 32 completely forms grayscale 65 of FIG. 3 including image regions $70_1$ through $70_{10}$. Each image area 70 of grayscale 65 has a different target dot area as described above. For example, the corresponding dot areas range from 10% to 100% in the embodiment illustrated in FIG. 3. While forming the exposure optimization test pattern of FIG. 3, the exposure level of radiation source 32 is fixed at the optimal exposure level that was set during the first phase of the calibration process.

Once each image area 70 is formed on imaging element 24, controller 30 proceeds to step 200 and calculates a dot area error for each image area 70 based on density readings from densitometer 34. Based on the calculated dot error for each image area 70, controller 30 generates a linearization mechanism, such as lookup table or a function, that minimizes error by mapping a target dot area to a corresponding actual dot area. Controller 30 then exits the exposure linearization phase in termination step 210.

CONCLUSION

Various embodiments of a method and device for calibrating an imaging apparatus have been described. In one embodiment, the present invention may be used to determine an optimal exposure for an imagesetter having a radiation source. In another embodiment, the present invention contemplates the automatic linearization of the exposure level without requiring operator intervention. The linearization mechanisms achieved by the calibration techniques contemplated by the present invention may be applied by the recorder, may be communicated to the raster image processor for application at the RIP level, or may involve a cooperative calibration scheme by both components.

Furthermore, the described method and device are suitable for calibrating a halftone imagesetter that forms latent images on a photosensitive imaging element and incorporates a processor for chemical processing and developing of the imaging element. Alternatively, the present invention is suitable for imagesetters and recorders that use other media including photothermographic and thermographic media.

The present invention also contemplates simplified optimization and linearization of the exposure level of an imagesetter based on parameterized sensitometric characteristics of the imaging element. Accordingly, this application is intended to cover any adaptations or variations of the present invention. It is manifestly intended that this invention be limited only by the claims and equivalents thereof.

We claim:

1. A method for calibrating a halftone imaging system having a radiation source for exposing an imaging element, the method comprising the steps of:

forming a plurality of image regions on an imaging element with the radiation source such that each image region is defined by at least one corresponding halftone cell, wherein the halftone cells of different image regions have an equal target dot area and are exposed by the radiation source at different exposure levels;

measuring a corresponding density for each image region; and setting an optimum exposure level for the halftone imaging system as a function of the measured densities for the image regions, wherein the setting step comprises:
measuring a minimum density for a non-imaged area of the element;
calculating an actual dot area for each image region as a function of the measured density of each image region and the measured minimum density; and
setting the optimum exposure level based on a difference between the target dot area and the calculated actual dot area of each image region.

2. The method of claim 1, wherein the step of setting the optimum exposure level further comprises the step of generating a dot-area versus exposure curve based on the calculated actual dot areas of the image regions.

3. The method of claim 1, wherein the step of measuring a corresponding density of each image region comprises the step of automatically measuring the density of each image region using a densitometer communicatively coupled to the imaging system, and further wherein the step of measuring the minimum density comprises the step of automatically measuring the minimum density using a densitometer communicatively coupled to the imaging system.

4. The method of claim 1, wherein the step of measuring the densities of each image region and the step of measuring the minimum density of the non-imaged area of the element are manually performed.

5. The method of claim 1, wherein the setting step sets the optimum exposure level such that the halftone imaging system produces 50% halftone cell having a dot area substantially equal to half of the 50% halftone cell.

6. The method of claim 1, wherein the setting step sets the optimum exposure level such that the halftone imaging system produces a 2% halftone cell having dot area approximately equal to a non-imaged area of a 98% halftone cell.

7. The method of claim 1, wherein the setting step sets the optimum exposure level such that the halftone imaging system produces a 50% halftone cell having a dot area greater than half of the 50% halftone cell.

8. A method for calibrating a halftone imaging system having a radiation source for exposing an imaging element, the method comprising the steps of:

forming a plurality of image regions on an imaging element with the radiation source such that each image region is defined by at least one corresponding halftone cell, wherein the halftone cells of different image regions have an equal target dot area and are exposed by the radiation source at different exposure levels, wherein the forming step includes the step of selecting the different exposure levels based on a predetermined parameterization of a sensitometric curve for the imaging element in order to form a reduced number of image regions;

measuring a corresponding density for each image region; and setting an optimum exposure level for the halftone imaging system as a function of the measured densities for the image regions.

9. The method of claim 8, wherein the setting step sets the optimum exposure level such that the halftone imaging system produces a 50% halftone cell having a dot area substantially equal to half of the 50% halftone cell.

10. The method of claim 8, wherein the setting step sets the optimum exposure level such that the halftone imaging system produces a 2% halftone cell having a dot area approximately equal to a non-imaged area of a 98% halftone cell.

11. The method of claim 8, wherein the setting step sets the optimum exposure level such that the halftone imaging system produces a 50% halftone cell having a dot area greater than half of the 50% halftone cell.

12. A method for calibrating a halftone imaging system having a radiation source for exposing an imaging element, the method comprising the steps of:

forming a first plurality of image regions on an imaging element with the radiation source, wherein each image region of the first plurality of image regions is defined by at least one corresponding halftone cell having a plurality of dots, and further wherein the dots of the halftone cells of different image regions have an equal target dot area and are exposed by the radiation source at different exposure levels;

setting an optimum exposure level for the imaging system based on a comparison between the target dot area and an actual dot area for each respective image region of the first plurality of image regions;

forming a second plurality of image regions on the element such that each image region of the second plurality of image regions is defined by at least one corresponding halftone cell having a plurality of dots, wherein the halftone cells of different image regions of the second plurality of image regions have different target dot areas and are exposed by the radiation source at the optimal exposure level; and developing a linearization mechanism for mapping subsequent target dot areas to respective actual dot areas based on a comparison between the target dot area and an actual dot area for each respective image region of the second plurality of image regions.

13. The method of claim 12, wherein the step of developing a linearization mechanism comprises the step of calculating a lookup table for mapping target dot areas to corresponding actual dot areas.

14. The method of claim 12, wherein the step of developing a linearization mechanism comprises the step of calculating a plurality of lookup tables according to variations in system parameters.

15. The method of claim 12, wherein the halftone imaging system includes a raster image processor and a recorder and the step of developing a linearization mechanism comprises the step of calculating a coarse lookup table and a fine-grain lookup table, and further wherein the coarse lookup table is applied by the raster image processor and the fine-grain lookup table is applied by the recorder.

16. The method of claim 12, wherein the step of developing a linearization mechanism comprises the step of generating a linearization function defining a relationship between target dot area and actual dot area.

17. The method of claim 12, wherein the step of setting the optimum exposure comprises the steps of:
    measuring a corresponding density for each image region of the first plurality of image regions;
    measuring a minimum density for a non-imaged area of the element;
    calculating the actual dot area for each image region of the first plurality of image regions as a function of the measured density of each image region of the first plurality of image regions and the measured minimum density; and
    generating a dot-area versus exposure curve based on the calculated actual dot areas for each image region of the first plurality of image regions.

18. The method of claim 17, wherein the step of measuring the densities of each image region of the first plurality of image regions and the step of measuring the minimum density of the element are performed by a densitometer communicatively coupled to the imaging system.

19. The method of claim 17, wherein the step of measuring the densities of each image region of the first plurality of image regions and the step of measuring the minimum density of the element are performed manually.

20. The method of claim 12, wherein the step of forming a second plurality of image regions forms a reduced number of image regions based on a predetermined parameterization of a sensitometric curve for the imaging element.

21. The method of claim 12, wherein the step of developing a linearization mechanism comprises the steps of:
    measuring a corresponding density for each image region of the second plurality of image regions;
    measuring a minimum density for a non-imaged area of the element;
    calculating the actual dot area for each of the image regions of the second plurality of image regions as a function of the measured density of each image region of the second plurality of image regions and the measured minimum density; and
    calculating an error between the target dot area for each of the image regions of the second plurality of image regions and the calculated actual dot area for each of the image regions of the second plurality of image regions.

22. The method of claim 21, wherein the step of measuring the densities of each image region of the second plurality of image regions and the step of measuring the minimum density of the element are automatically performed by a densitometer communicatively coupled to the imaging system.

23. The method of claim 21, wherein the step of measuring the densities of each image region of the second plurality of image regions and the step of measuring the minimum density of the element are performed manually.

24. An apparatus for calibrating a halftone imaging system comprising:
    a radiation source for exposing an imaging element;
    a densitometer for measuring a density of the imaging element; and
    a controller coupled to the radiation source and the densitometer, the controller adapted to perform the steps of:
        (i) controlling the radiation source to form a first plurality of image regions on an imaging element such that each image region of the first plurality of image regions is defined by at least one corresponding halftone cell having a plurality of dots, wherein the dots of the halftone cells of different image regions have an equal target dot area and are exposed by the radiation source at different exposure levels;
        (ii) controlling the densitometer to measure a corresponding density for each image region of the first plurality of image regions;
        (iii) controlling the densitometer to measure a minimum density for a non-imaged area of the imaging element;
        (iv) calculating an actual dot area for each image region of the first plurality of image regions as a function of the measured density of each image region of the first plurality of image regions and the measured minimum density;
        (v) setting an optimum exposure level for the imaging system based on a comparison between the target dot area and the calculated actual dot area for each image region of the first plurality of image regions;
        (vi) controlling the radiation source to form a second plurality of image regions on the imaging element such that each image region of the second plurality of image regions is defined by at least one corresponding halftone cell having a plurality of dots, wherein the halftone cells of different image regions of the second plurality of image regions have different target dot areas and are exposed by the radiation source at the determined optimal exposure level;
        (vii) measuring a corresponding density for each image region of the second plurality of image regions;
        (viii) calculating an actual dot area for each of the image regions of the second plurality of image regions as a function of the measured density of each image region of the second plurality of image regions and the measured minimum density;
        (ix) calculating an error between the target dot area for each of the image regions of the second plurality of image regions and the respective actual dot area; and
        (x) developing a linearization mechanism for mapping subsequent target dot areas to respective actual dot areas based on the calculated error.

25. The apparatus of claim 24, wherein the step of developing a linearization mechanism comprises the step of calculating a plurality of lookup tables according to variations in system parameters including at least resolution and imaging speed.

26. The apparatus of claim 24, wherein the step of developing a linearization mechanism comprises the step of generating a linearization function defining a relationship between target dot area and actual dot area.

27. A halftone imaging system for forming a calibrated output image on an output media according to a page description language, the halftone imaging system comprising:

a recorder comprising:
- a radiation source for exposing an imaging element;
- a densitometer for measuring a density of the imaging element;
- a controller coupled to the radiation source and the densitometer, the controller adapted to perform the steps of:
  (i) controlling the radiation source to form a first plurality of image regions on an imaging element such that each image region of the first plurality of image regions is defined by at least one corresponding halftone cell having a plurality of dots, wherein the dots of the halftone cells of different image regions have an equal target dot area and are exposed by the radiation source at different exposure levels,
  (ii) controlling the densitometer in order to determine an optimum exposure level for the imaging system based on a comparison between the target dot area and an actual dot area for each image region of the first plurality of image regions,
  (iii) controlling the radiation source to form a second plurality of image regions on the element such that each image region of the second plurality of image regions is defined by at least one corresponding halftone cell having a plurality of dots, wherein the halftone cells of different image regions of the second plurality of image regions have different target dot areas and are exposed by the radiation source at the determined optimal exposure level, and
  (iv) controlling the densitometer in order to develop a linearization mechanism for mapping subsequent target dot areas to respective actual dot areas; and a raster image processor for receiving image data characterized by a page description language and providing raster data to the recorder based on the image data, wherein the recorder communicates the linearization mechanism to the raster image processor for mapping target dot areas to target dot areas while processing the page description language.

* * * * *